W. S. HICKS.

Watch-Chain Bar.

No. 8,273. Reissued June 4, 1878.

*Witnesses:*

Donn P. Twitchell

S. M. Maddox

*Inventor:*

W. S. Hicks by W. C. Dodge

Atty.

N. PETERS, PHOTO-LITHOGRAPHER, WASHINGTON, D. C.

UNITED STATES PATENT OFFICE.

WILLIAM S. HICKS, OF NEW YORK, N. Y.

IMPROVEMENT IN WATCH-CHAIN BARS.

Specification forming part of Letters Patent No. 187,851, dated February 27, 1877; Reissue No. 8,273, dated June 4, 1878; application filed May 20, 1878.

*To all whom it may concern:*

Be it known that I, WILLIAM S. HICKS, of New York, in the county of New York and State of New York, have invented certain new and useful Improvements in Chain-Bars; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to what are technically known as "chain-bars," for use on watch-chains; and the invention consists in forming the body of the bar of a tube open at one end, and provided at its opposite end with an ornamental head; and in combining therewith a detachable case or handle, having on its outer end an ornamental head corresponding with that on the body, and carrying at its opposite end a pencil-point or other similar utensil, so that when this latter is inserted within the bar it shall have the appearance of a simple bar with an ornamental head at each end, and so that the handle or case with its utensil can be detached for use when desired, as hereinafter more fully described.

Figure 1:
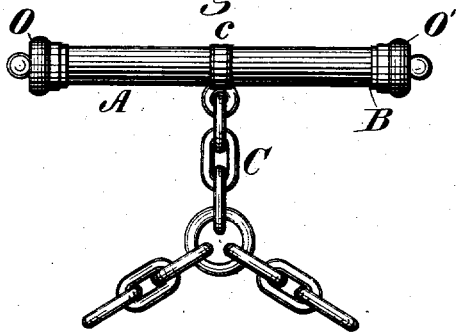
Figure 2:
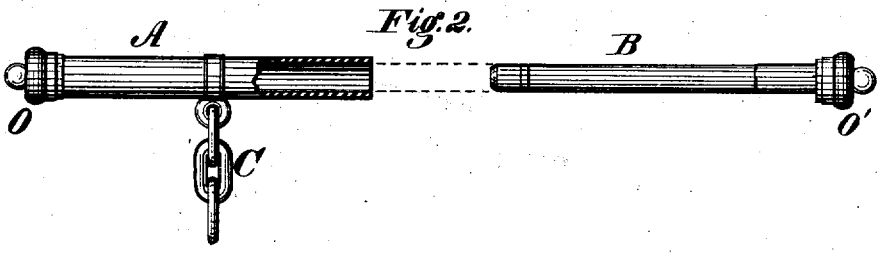
Figure 3:
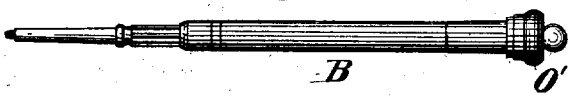

Figure 1 represents the improved chain-bar complete, and as usually attached to a chain. Fig. 2 represents the same with the parts detached; and Fig. 3 represents the case or handle detached, and as carrying a pencil-point, extended, ready for use.

Various styles of what are known to the trade as "chain-bars," sometimes called "toggles," have heretofore been constructed with a pencil-point arranged to slide out at one end so as to project therefrom; but, as is obvious, in such case the pencil cannot be used to advantage without detaching the chain to which the bar is attached from the vest, and even then can only be used with difficulty. So, too, these bars or toggles have been made with a watch-key or tooth-pick made to fit into one end; but in such cases the parts were not each provided with the ornamental heads, nor so made that when put together they would form a bar of uniform size and appearance at its opposite ends, and therefore were not used to any considerable extent for the purpose designed—that is, as chain-bars.

The object of this invention is to produce a neat and ornamental bar, and which, while having the appearance of a mere chain-bar, shall have within it a case carrying a pencil-point, or any similar tool that may be desired, which can be wholly detached from the bar, so that when needed for use it can be held in the hand and used with the same facility that such articles can be as ordinarily carried in the pocket.

To accomplish this result, I construct the bar in the form of a tubular case, A, with an ornamental head, O, at end, its opposite end being left open, as shown at Fig. 2, where a portion is shown in section to indicate that it is an open tube, it having a ring, *c*, secured at its center for connecting it to the chain C, as shown in Figs. 1 and 2. I then make a small case, B, of any desired style, it being preferably an extension-case, but having its head O′ made to correspond in style and appearance with the head *o* on the opposite end of the bar A, as shown in Figs. 1 and 2.

This case B is made of such a diameter as to fit snugly within the bar A when shoved therein, so as to be in no danger of dropping out or being accidentally displaced, and is made of such a length that when inserted into the bar A its head *o′* will fit close against the open end of the bar, so that it will have the appearance of being permanently connected thereto, the same as is the head at the opposite end. When thus constructed and put together, as represented in Fig. 1, the whole has the appearance of a single solid bar, which, of course, may be made of any desired pattern, and more or less ornamental, as may be desired.

In order to render the case B more convenient for use, I prefer to make it with a screw for projecting the pencil-point, or whatever may be attached to it, in the same manner that ordinary pencil-cases are constructed, as by that means it can be elongated, so as to be more conveniently handled, especially as a pencil or other case made to fit within a chain-bar must of necessity be very small. It is, however, obvious that the extension feature may be omitted, the case B in that case being made without the screw for projecting the point.

In Fig. 3 I have shown the case B as having a pencil-point attached; but it is obvious that, instead of the pencil-point, a tooth-pick, ear-spoon, or any similar small implement may be substituted, if desired, without other change in the parts.

By this construction I am enabled to produce a neat and ornamental bar, and at the same time have a pencil or similar implement which is securely protected within the bar, and that can be detached therefrom and used with convenience at any time, and without detaching the chain or bar.

Having thus described my invention, what I claim is—

1. The open-ended tubular chain-bar A, provided with a central ring, *c*, in combination with the detachable case B, constructed and arranged to operate substantially as described.

2. The tubular chain-bar A, provided at one end with an ornamental head, O, in combination with the detachable case B, provided with a corresponding head, O′, arranged to fit together, substantially as described, so that when united the whole shall have the appearance of a single solid bar, as set forth.

3. In combination with the tubular chain-bar A, the detachable holder or case B, the said parts being constructed and adapted for use substantially as and for the purpose set forth.

WILLIAM S. HICKS.

Witnesses:
W. H. SEMBLER,
FORMAN WHITNEY.